(12) United States Patent
Halcoussis et al.

(10) Patent No.: US 12,326,091 B2
(45) Date of Patent: Jun. 10, 2025

(54) GUIDE VANE ARRANGEMENT FOR A TURBOMACHINE, COMPRESSOR MODULE, AND TURBOMACHINE

(71) Applicant: MTU AERO ENGINES AG, Munich (DE)

(72) Inventors: Alexander Halcoussis, Munich (DE); Harsimar Sahota, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 18/018,073

(22) PCT Filed: Jul. 29, 2021

(86) PCT No.: PCT/DE2021/100650
§ 371 (c)(1),
(2) Date: Jan. 26, 2023

(87) PCT Pub. No.: WO2022/022780
PCT Pub. Date: Feb. 3, 2022

(65) Prior Publication Data
US 2023/0265766 A1 Aug. 24, 2023

(30) Foreign Application Priority Data
Jul. 30, 2020 (DE) ...................... 10 2020 209 586.8

(51) Int. Cl.
*F01D 17/16* (2006.01)
*F01D 5/14* (2006.01)
*F04D 29/56* (2006.01)

(52) U.S. Cl.
CPC .......... *F01D 17/162* (2013.01); *F01D 5/143* (2013.01); *F04D 29/563* (2013.01); *F05D 2250/713* (2013.01)

(58) Field of Classification Search
CPC ........ F01D 5/143; F01D 17/16; F01D 17/162; F01D 9/02; F01D 9/04; F01D 9/041;
(Continued)

(56) References Cited

U.S. PATENT DOCUMENTS

| 4,856,962 A | 8/1989 | McDow | |
| 6,508,630 B2 * | 1/2003 | Liu | F04D 29/544 |
| | | | 416/243 |

(Continued)

FOREIGN PATENT DOCUMENTS

| CN | 104100305 A | 10/2014 |
| DE | 10233033 A1 | 1/2004 |

(Continued)

*Primary Examiner* — Sang K Kim
(74) *Attorney, Agent, or Firm* — LEYDIG, VOIT & MAYER, LTD.

(57) ABSTRACT

A guide vane for arrangement in a gas duct of a turbomachine, including a guide vane blade and an outer platform which, relative to a longitudinal axis of the turbomachine, is arranged radially on an outside on the guide vane blade. The outer platform delimits the gas duct with an inner wall surface radially to the outside. The inner wall surface has a curved profile with an inflection point when viewed in an axial section, the inner wall surface having a concave curvature in a first axial section which is upstream from the inflection point with respect to a flow through the gas duct, and a convex curvature in a second axial section which is arranged downstream from the inflection point with respect to the flow through the gas duct.

16 Claims, 3 Drawing Sheets

(58) Field of Classification Search
CPC ........... F05D 2240/11; F05D 2250/711; F05D 2250/712; F05D 2250/713
See application file for complete search history.

(56) References Cited

U.S. PATENT DOCUMENTS

| | | | |
|---|---|---|---|
| 6,843,638 | B2 | 1/2005 | Hidalgo et al. |
| 7,011,495 | B2 * | 3/2006 | Guemmer ................ F01D 5/143 415/199.5 |
| 7,189,056 | B2 | 3/2007 | Girgis et al. |
| 9,334,745 | B2 | 5/2016 | Miyoshi et al. |
| 10,287,902 | B2 | 5/2019 | Sak et al. |
| 10,480,531 | B2 * | 11/2019 | Shibata ................ F04D 29/542 |
| 2004/0013520 | A1 | 1/2004 | Guemmer |
| 2012/0315136 | A1 | 12/2012 | Sonoda et al. |
| 2017/0314406 | A1 | 11/2017 | Wolf et al. |
| 2018/0156236 | A1 | 6/2018 | Duong |
| 2019/0249561 | A1 | 8/2019 | Bazot |
| 2020/0003073 | A1 * | 1/2020 | Karapurath ............. F01D 9/041 |
| 2020/0248572 | A1 * | 8/2020 | Adhate .................. F01D 9/041 |

FOREIGN PATENT DOCUMENTS

| | | | |
|---|---|---|---|
| EP | 1710395 | A2 | 10/2006 |
| EP | 3124794 | A1 | 2/2017 |
| EP | 3246518 | A1 | 11/2017 |
| EP | 3690189 | A1 | 8/2020 |

* cited by examiner

GUIDE VANE ARRANGEMENT FOR A TURBOMACHINE, COMPRESSOR MODULE, AND TURBOMACHINE

CROSS REFERENCE TO RELATED APPLICATIONS

This application is a U.S. National Phase application under 35 U.S.C. § 371 of International Application No. PCT/DE2021/100650,filed on Jul. 29, 2021, and claims benefit to German Patent Application No. DE 10 2020 209 586.8, filed on Jul. 30, 2020. The International Application was published in German on Feb. 3, 2022 as WO 2022/022780 A1 under PCT Article 21(2).

FIELD

The present invention relates to a guide vane for arranging in the gas duct of a turbomachine.

BACKGROUND

The turbomachine can be for example, a jet engine such as a turbofan. This is functionally divided into a compressor, combustion chamber and turbine. Drawn air is compressed in the compressor and burned in the downstream combustion chamber with added kerosene. The resulting hot gas, a mixture of combustion gas and air, flows through the downstream turbine and is expanded in the process. Energy is also removed proportionally from the flowing gas in order to also drive the compressor or the fan in the case of a turbofan. The present object addresses a guide vane, and in particular a compressor module.

SUMMARY

In an embodiment, the present disclosure provides a guide vane for arrangement in a gas duct of a turbomachine, comprising a guide vane blade and an outer platform which, relative to a longitudinal axis of the turbomachine, is arranged radially on an outside on the guide vane blade, wherein the outer platform delimits the gas duct with an inner wall surface radially to the outside, wherein the inner wall surface has a curved profile with an inflection point when viewed in an axial section, the inner wall surface having a concave curvature in a first axial section which is upstream from the inflection point with respect to a flow through the gas duct, and a convex curvature in a second axial section which is arranged downstream from the inflection point with respect to the flow through the gas duct.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
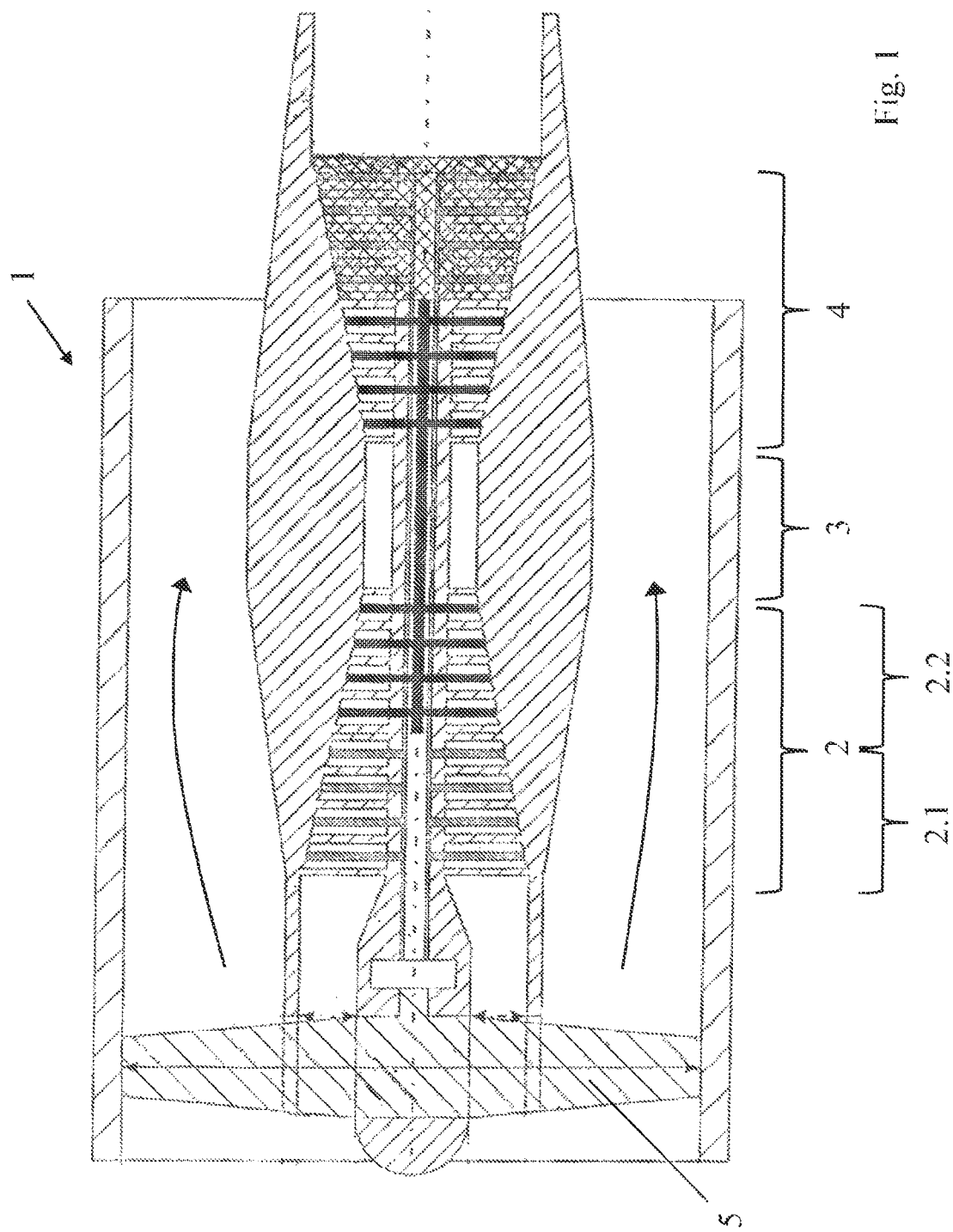
FIG. 1 shows a turbomachine, specifically a turbofan engine, in an axial section.

In an embodiment, the present invention includes a particularly advantageous guide vane.

In an embodiment an outer shroud is provided which is arranged radially on the outside of the blade, that is to say, delimits the gas duct radially to the outside with its inner wall surface. This inner wall surface of the outer shroud is designed such that, when viewed in an axial section, it has a curved profile with an inflection point. It has:

a concave curvature in a first axial section before the inflection point, and a convex curvature in a second axial section after the inflection point.

Due to the concave curvature of the inner wall surface as viewed from the gas duct, the annular space in the first axial section is convexly curved (viewed in the axial section), and it therefore has a convex outer lateral surface. Accordingly in the second axial section, due to the convex curvature of the inner wall surface, the annular space is concavely curved (viewed in the axial section), and it therefore has a concave outer lateral surface. If one considers the contraction, i.e. the annulus area ratio of a respective rotor between its trailing and leading edges, the contraction of the rotor in front of the stator is increased somewhat with this inner wall or annular course in the stator.

With the stronger contraction, i.e. the tapering of the annular area along the baffle, the blade load decreases (the De Haller number or V2/V1 becomes larger because V2 becomes larger), which can be advantageous, for example, with regard to stability and efficiency. In relation to an overall compressor module, the contraction of a baffle per se cannot be arbitrarily increased, however, because this comes at the expense of the contraction of the adjacent baffles. With the present course, that is to say the change between concave and convex curvature, the contraction of the downstream rotor is somewhat reduced to increase the contraction of the upstream rotor. Overall, the inventors have observed a positive effect on the stage efficiency.

In the present disclosure, if, for example, a guide vane is described, this is also to be considered in a guide vane arrangement with such a guide vane and a housing element, or also in a compressor module or a turbomachine with a corresponding guide vane.

The terms "axial," "radial" and "circumferential," as well as the associated directions (axial direction, etc.), refer to the longitudinal axis of the turbomachine in the context of this disclosure. This coincides, for example, with a rotor axis of rotation around which the rotors rotate during operation. The "axial section" relates to a sectional plane, which includes the longitudinal axis, i.e. a longitudinal section. In all axial sections, the inner wall surface of the outer platform preferably has a corresponding course with an inflection point; particularly preferably, this applies to the entire annular space of the guide baffle, that is to say for all successive guide vanes in a circular pattern.

According to a preferred embodiment, the inflection point lies in the front 40% of the axial chord length taken radially at the level of the inner wall surface. The axial chord length is taken in a tangential section, which lies radially at the level of the inner wall surface, that is to say at the radially outer end of the trailing edge. It then results as an axial section of the connecting line between the leading and trailing edges, wherein in terms of quantitative considerations, 0% is at the level of the front edge, and 100% is at the level of the trailing edge.

In a preferred embodiment, the inflection point lies axially after the first 10% of the axial chord length, particularly preferably in a range between 25% and 30% of the axial chord length.

According to a preferred embodiment, the guide vane is part of a guide vane arrangement with a housing element on which the guide vane is adjustably mounted to set its inflow angle. In this bearing, it can therefore be rotated about a guide vane rotary axis which can be achieved, for example, with a journal radially on the outside of the outer platform and another journal radially on the inside of the inner platform. Regardless of these details, the guide vane rotary axis passes through the outer platform; it can, for example, be substantially radial in relation to the longitudinal axis of the turbomachine.

With such an adjustable guide vane, the inflection point of the inner wall surface preferably lies axially in front of the guide vane rotary axis (axially relative to the longitudinal axis). In the individual axial section(s) in which the course of curvature according to the main claim is considered, the rotary axis of the guide vane is considered a circumferential projection, i.e. it is projected in the respective section plane in the direction of rotation.

In a preferred embodiment, the guide vane rotary axis is located behind the first 20% and/or in the front 55% of the axial chord length, particularly preferably between 35% and 45% of the axial chord length.

In an embodiment, the present invention also relates to a compressor module, wherein the guide vane disclosed in the present case is part of a guide vane ring, i.e. a guide baffle. Preferably, all guide vanes of the ring are set with a corresponding curvature; particularly preferably they are structurally identical to one another. Independently of this, the compressor module has a first guide baffle upstream from the guide baffle, and a second guide baffle downstream from the guide baffle. Reference is made to the advantages mentioned above. The first guide baffle can in particular be the first guide baffle of the module as a whole.

In an embodiment, the present invention further relates to a turbomachine having a corresponding guide vane or guide vane arrangement, in particular an aircraft engine. The latter can preferably be a turbofan engine.

Embodiments of the invention will be explained in more detail below with reference to an exemplary embodiment.

FIG. 1 shows a turbomachine 1, specifically a turbofan engine, in an axial section. It is functionally divided into the compressor 2, combustion chamber 3 and turbine 4. Drawn air is compressed in the compressor 2, which consists of a low-pressure compressor 2.1 and a high-pressure compressor 2.2. In the combustion chamber 3, kerosene is then added, and this mixture is combusted. The hot gas is expanded in the turbine 4, wherein energy is extracted proportionally from the hot gas (via the movement of the rotors). This is used on the one hand for driving the rotors of the compressor 2, and on the other hand for driving the fan 5, which substantially generates the feed of the turbofan engine 1.

Figure 2:
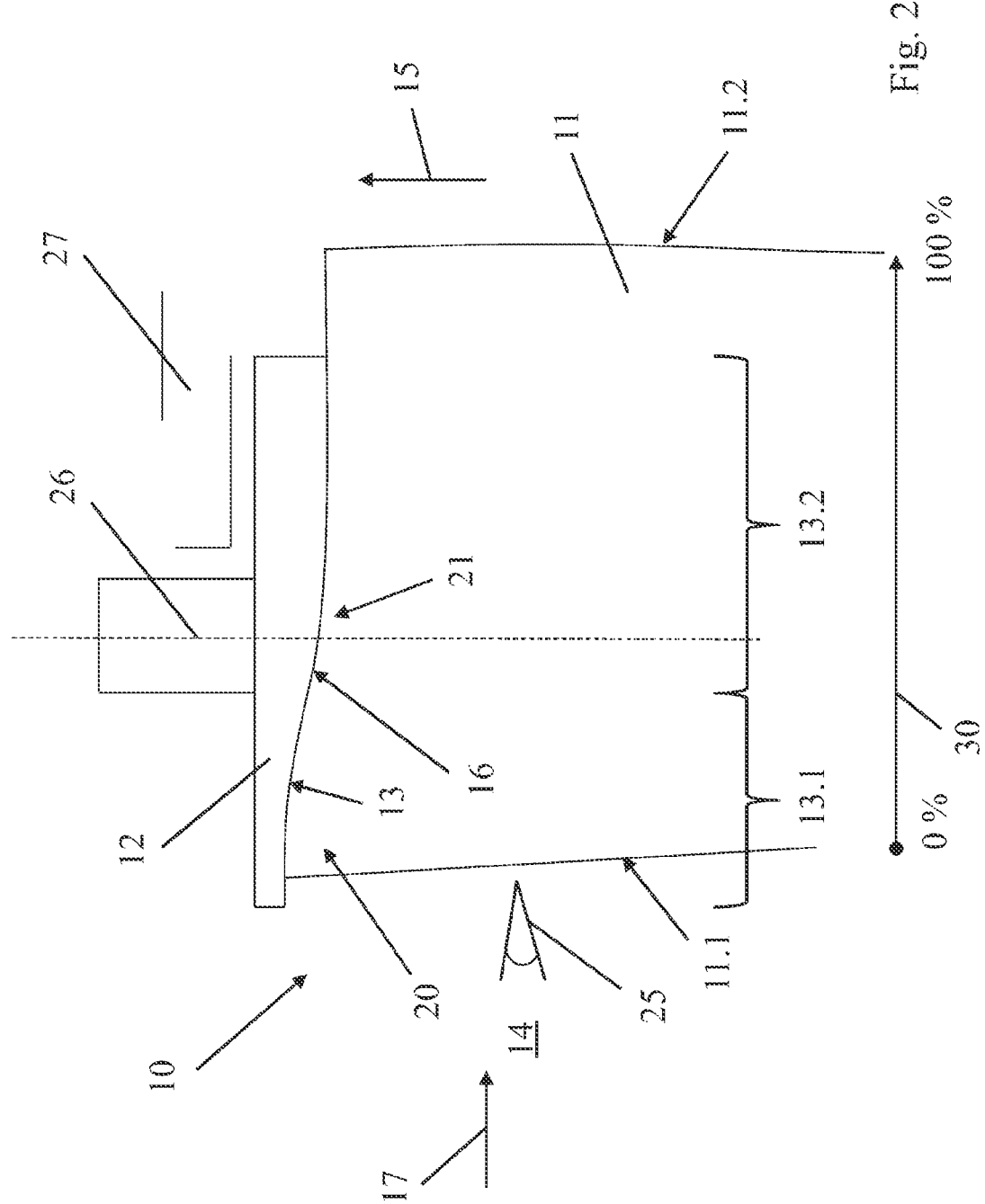
FIG. 2 shows a guide vane according to an embodiment of the invention in a schematic axial section.

FIG. 2 shows a guide vane 10 according to an embodiment of the invention with a guide vane blade 11 and an outer platform 12. The outer platform 12 delimits the gas duct 14 radially 15 with an inner wall surface 13. According to an embodiment of the invention, this inner wall surface 13 has a curved profile with an inflection point 16. It has a concave curvature 20 in a first axial section 13.1, which is upstream from the inflection point 16 with respect to a flow 17 through the gas duct 14, and a convex curvature 21 in the downstream second axial section 13.2. The annular space is complementary, i.e. convex in the first axial section 13.1, and concavely curved in the second axial section 13.2.

The guide vane 10 is designed to be adjustable in order to adjust an inflow angle 25, i.e., rotatably mounted about a guide vane rotary axis 26 on a housing element 27. The inflection point 16 lies axially in front of the guide vane rotary axis 26; relative to an axial chord length 30 taken between the front and trailing edges 11.1, 11.2 of the guide vane blade 11, the inflection point 16 lies in a range between 25% and 30% of the axial chord length.

Figure 3:
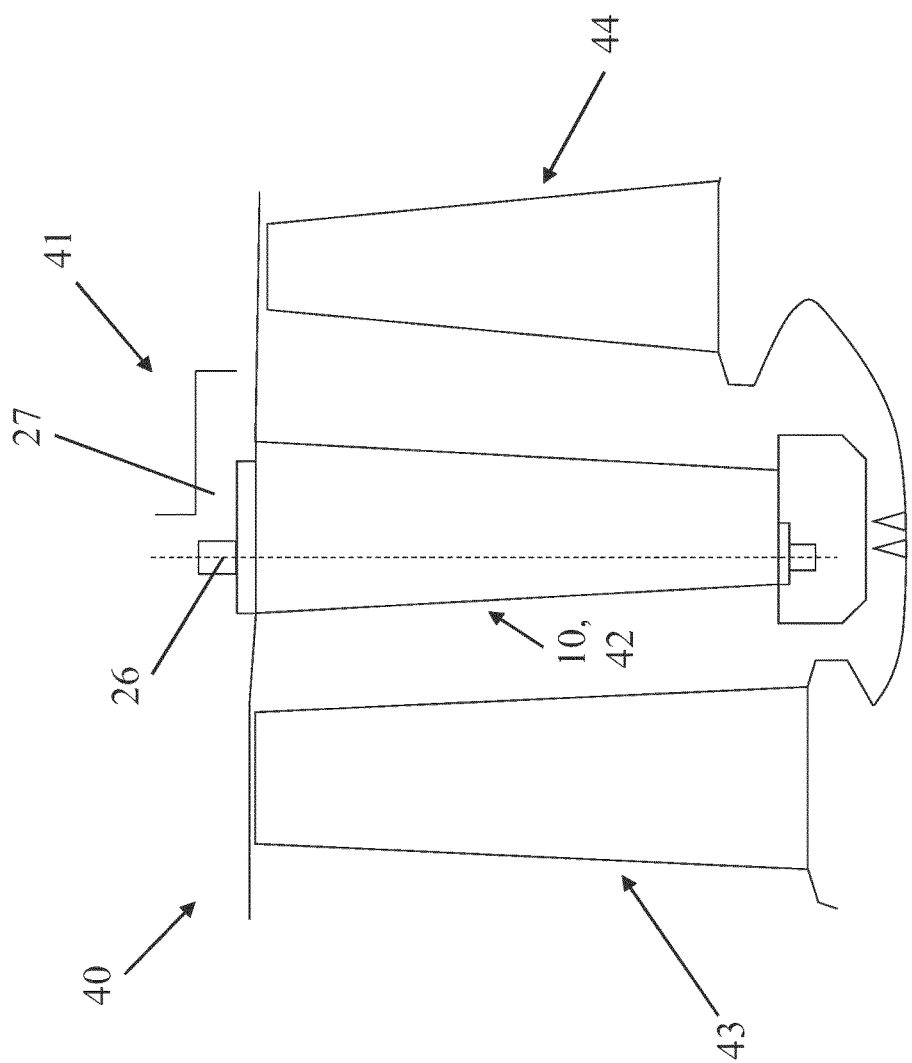
FIG. 3 shows a part of a compressor module with a guide vane.

FIG. 3 shows a part of a compressor module 40 with the guide vane 10 which was discussed in detail with reference to FIG. 2 and which, together with the housing element 27, represents a guide vane arrangement 41. The guide vane 10 is part of a guide vane ring 42, i.e. guide baffle (stator). A first guide vane ring 43 is upstream therefrom, and a second guide vane ring 44 is downstream (i.e. in each case a guide baffle, i.e. a rotor). As explained in detail in the introduction to the description, the contraction of the first guide vane ring 43 increases with the curved profile of the inner wall surface 13 at the expense of the contraction of the second guide vane ring 44, which improves efficiency from an overall perspective.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Turbomachine 1
Compressor 2
Low pressure compressor 2.1
High pressure compressor 2.2
Combustion chamber 3
Turbine 4
Fan 5
Guide vane 10

Guide vane blade 11
Front edge 11.1
Rear edge 11.2
Outer platform 12
Inner wall surface 13
First axial section 13.1
Second axial section 13.2
Gas duct 14
Radial direction 15
Turning point 16
Flow 17
Concave curvature 20
Convex curvature 21
Inflow angle 25
Guide vane rotary axis 26
Housing element 27
Chord length 30
Compressor module 40
Guide vane arrangement 41
Guide vane ring 42
First guide vane ring 43
Second guide vane ring 44

The invention claimed is:

1. A guide vane for arrangement in a gas duct of a turbomachine, comprising:
   a guide vane blade; and
   an outer platform which, relative to a longitudinal axis of the turbomachine, is arranged radially on an outside on the guide vane blade,
   wherein the outer platform delimits the gas duct with an inner wall surface radially to the outside,
   wherein the inner wall surface has a curved profile with an inflection point when viewed in an axial section, the inner wall surface having:
   a concave curvature in a first axial section which is upstream from the inflection point with respect to a flow through the gas duct, and
   a convex curvature in a second axial section which is arranged downstream from the inflection point with respect to the flow through the gas duct
   wherein the guide vane is adjustable to set an inflow angle,
   wherein the guide vane is configured to be rotatably mounted about a guide vane rotation axis passing through the outer platform,
   wherein the inflection point is located upstream of the guide vane rotation axis, and
   wherein the curved profile of the inner wall surface is characterized by a decreasing function, with respect to a radial distance to an axis of the turbomachine, between a leading edge of the blade and the inflection point.

2. The guide vane according to claim 1, wherein the inflection point relative to an axial chord length taken radially at a level of the inner wall surface and ranging from 0% at the leading edge to 100% at the trailing edge lies in a range between 0% and 40% of the axial chord length.

3. The guide vane according to claim 2, wherein the inflection point lies in a range between 10% and 40% of the axial chord length.

4. The guide vane according to claim 3, wherein the inflection point lies in a range between 25% and 30% of the axial chord length.

5. A compressor module having the guide vane according to claim 1, wherein the guide vane is part of a guide vane ring, wherein a first guide vane ring is arranged upstream from the guide vane ring in the compressor module, and a second guide vane ring is arranged downstream.

6. The compressor module according to claim 5, wherein exactly one guide vane ring is upstream from the guide vane ring with the guide vane.

7. A turbomachine having the guide vane according to claim 1.

8. The turbomachine of claim 7, wherein the turbomachine is an aircraft engine.

9. A turbomachine having the compressor module according to claim 5.

10. The turbomachine according to claim 7, wherein the turbomachine comprises the guide vane as a stator of a guide vane ring, the guide vane ring comprising a first guide vane ring arranged as a rotor upstream from the guide vane ring, and a second guide vane ring arranged as a second rotor downstream from the guide vane ring, and wherein the inflection point is located axially upstream of the guide vane rotation axis such that a contraction of the first guide vane ring configured to be arranged as the rotor upstream from the guide vane ring is effectively increased, and a contraction of the second guide vane ring configured to be arranged as the second rotor downstream from the guide vane ring is correspondingly decreased.

11. A guide vane arrangement, the guide vane arrangement comprising:
   a guide vane for arrangement in a gas duct of a turbomachine, the guide vane comprising:
   a guide vane blade; and
   an outer platform which, relative to a longitudinal axis of the turbomachine, is arranged radially on an outside on the guide vane blade,
   wherein the outer platform delimits the gas duct with an inner wall surface radially to the outside,
   wherein the inner wall surface has a curved profile with an inflection point when viewed in an axial section, the inner wall surface having:
   a concave curvature in a first axial section which is upstream from the inflection point with respect to a flow through the gas duct, and
   a convex curvature in a second axial section which is arranged downstream from the inflection point with respect to the flow through the gas duct; and
   a housing element on which the guide vane is adjustable to set an inflow angle and is rotatably mounted about a guide vane axis passing through the outer platform,
   wherein the inflection point of the curved profile of the inner wall surface lies axially in front of the guide vane axis relative to the longitudinal axis of the turbomachine, and
   wherein the curved profile of the inner wall surface is characterized by a decreasing function, with respect to a radial distance to an axis of the turbomachine, between a leading edge of the blade and the inflection po int.

12. The guide vane arrangement according to claim 11, wherein the guide vane rotary axis, relative to an axial chord length taken radially at the level of the inner wall surface and ranging from 0% at the leading edge to 100% at the trailing edge, lies in a range between 35% and 45% of the axial chord length.

13. A compressor module having the guide vane arrangement according to claim 11, wherein the guide vane is part of a guide vane ring, wherein a first guide vane ring is arranged upstream from the guide vane ring in the compressor module, and a second guide vane ring is arranged downstream.

14. The compressor module according to claim 13, wherein exactly one guide vane ring is upstream from the guide vane ring with the guide vane.

15. A turbomachine having the guide vane arrangement according to claim 11.

16. A guide vane for arrangement in a gas duct of a turbomachine, the guide vane comprising:
- a guide vane blade; and
- an outer platform which, relative to a longitudinal axis of the turbomachine, is arranged radially on an outside on the guide vane blade,
- wherein the outer platform delimits the gas duct with an inner wall surface radially to the outside,
- wherein the inner wall surface has a curved profile with an inflection point when viewed in an axial section, the inner wall surface having:
- a concave curvature in a first axial section which is upstream from the inflection point with respect to a flow through the gas duct, and
- a convex curvature in a second axial section which is arranged downstream from the inflection point with respect to the flow through the gas duct,
- wherein the inflection point relative to an axial chord length taken radially at a level of the inner wall surface and ranging from 0% at the leading edge to 100% at the trailing edge lies in a range between 0% and 40% of the axial chord length,
- wherein the inflection point lies in a range between 10% and 40% of the axial chord length, and
- wherein the curved profile of the inner wall surface is characterized by a decreasing function, with respect to a radial distance to an axis of the turbomachine. between a leading edge of the blade and the inflection point.

* * * * *